US008892092B2

(12) United States Patent
Wijting et al.

(10) Patent No.: US 8,892,092 B2
(45) Date of Patent: Nov. 18, 2014

(54) SETUP OF DEVICE TO DEVICE CONNECTION

(71) Applicant: Nokia Corporation, Espoo (FI)

(72) Inventors: Carl Wijting, Espoo (FI); Klaus F. Doppler, Albany, CA (US); Cassio Barboza Ribeiro, Espoo (FI); Mika P. Rinne, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 14/033,674

(22) Filed: Sep. 23, 2013

(65) Prior Publication Data

US 2014/0038590 A1    Feb. 6, 2014

Related U.S. Application Data

(62) Division of application No. 12/218,491, filed on Jul. 14, 2008, now Pat. No. 8,577,363.

(51) Int. Cl.
*H04W 72/02* (2009.01)
*H04W 76/02* (2009.01)

(52) U.S. Cl.
CPC ............ *H04W 72/02* (2013.01); *H04W 76/023* (2013.01)
USPC ...................... 455/426.1; 455/456.1; 455/450

(58) Field of Classification Search
USPC ........... 455/433; 370/352, 467; 380/271–273, 380/247
See application file for complete search history.

(56) References Cited

U.S. PATENT DOCUMENTS

| | | | |
|---|---|---|---|
| 5,666,661 A | 9/1997 | Grube et al. | 455/509 |
| 5,889,861 A * | 3/1999 | Ohashi et al. | 380/247 |
| 5,995,500 A | 11/1999 | Ma et al. | 370/337 |
| 6,047,178 A | 4/2000 | Frian | 455/423 |
| 6,415,146 B1 | 7/2002 | Capece | 455/426 |
| 6,904,055 B2 * | 6/2005 | Pichna et al. | 370/467 |
| 7,050,821 B2 | 5/2006 | Nitta et al. | 455/462 |
| 2003/0076819 A1 * | 4/2003 | Emerson, III | 370/352 |
| 2006/0160544 A1 * | 7/2006 | Sun et al. | 455/456.1 |
| 2006/0178148 A1 | 8/2006 | Du et al. | 455/445 |
| 2007/0104138 A1 | 5/2007 | Rudolf et al. | 370/329 |
| 2007/0105496 A1 | 5/2007 | Bonta et al. | 455/13.1 |
| 2007/0197212 A1 * | 8/2007 | Marsico et al. | 455/433 |
| 2007/0211677 A1 | 9/2007 | Laroia et al. | 370/338 |
| 2008/0002658 A1 | 1/2008 | Soliman | 370/343 |

FOREIGN PATENT DOCUMENTS

WO    WO-2004-080103 A1    9/2004

OTHER PUBLICATIONS

"Address Allocation for Private Internets", Y. Rekhter et al., IETF 1918, Feb. 1996, 9 pgs.

(Continued)

*Primary Examiner* — Kashif Siddiqui
(74) *Attorney, Agent, or Firm* — Harrington & Smith

(57) ABSTRACT

Disclosed are apparatus, methods and computer programs to establish device-to-device communications in a wireless network. A method includes sending an initiation message from a first device to initiate device-to-device communication with a second device; receiving a message indicating a request for setting up radio resources for device-to-device communication; sending a message to the second device, the message including a request to set up resources for device-to-device communication and, in response to establishing device-to-device communication with the second device using the resources, sending an acknowledgment that device-to-device communication is established.

16 Claims, 14 Drawing Sheets

(56) References Cited

OTHER PUBLICATIONS

"3$^{rd}$ Generation Partnership Project; Technical Specification Group Radio Access Network;, Evolved Universal Terrestrial Radio Access Network (E-UTRAN); Architecture description (Release 8)", 3GPP TS 36.401 V.8.2.0 (Jun. 2008), 18 pgs.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)", 3GPP TS 23.401 V.8.0.0 (Dec. 2007), 167 pgs.

* cited by examiner

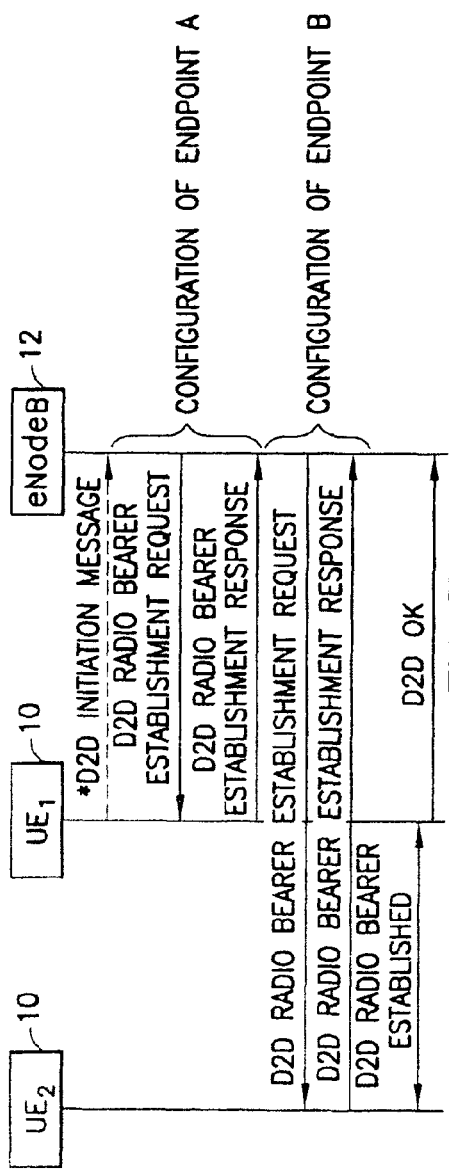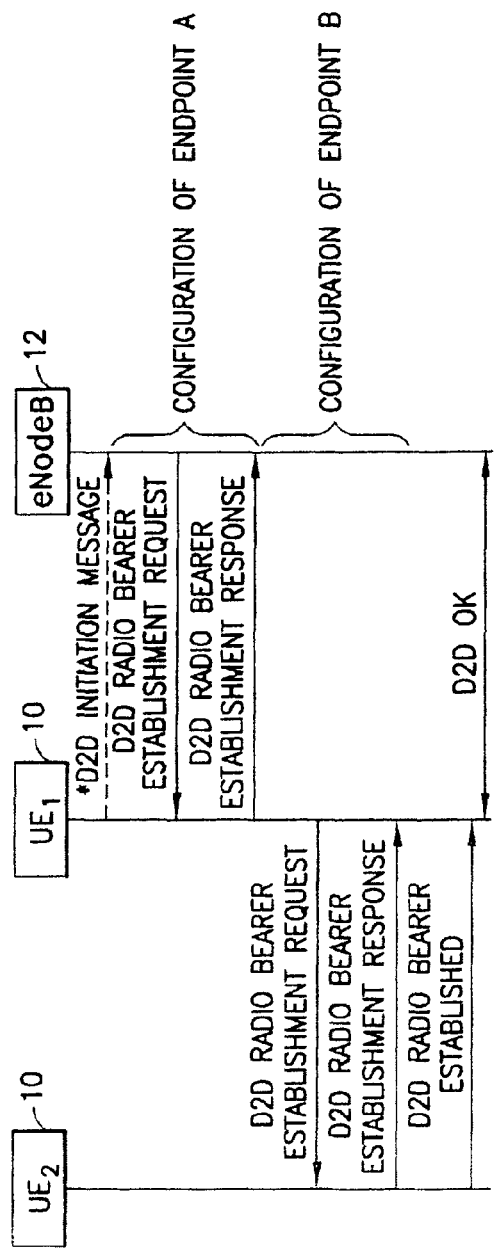

US 8,892,092 B2

SETUP OF DEVICE TO DEVICE CONNECTION

CROSS-REFERENCE TO RELATED APPLICATIONS

This application is a divisional application of U.S. patent application Ser. No. 12/218,491, filed Jul. 14, 2008, and incorporated herein by reference in its entirety.

TECHNICAL FIELD

The exemplary and non-limiting embodiments of this invention relate generally to wireless communication systems, methods, devices and computer programs and, more specifically, relate to the setup of device-to-device type of connections.

BACKGROUND

Various abbreviations that appear in the specification and/or in the drawing figures are defined as follows:
3GPP third generation partnership project
UTRAN universal terrestrial radio access network
EUTRAN evolved UTRAN (LTE)
LTE long term evolution
Node B base station
eNB EUTRAN Node B (evolved Node B)
UE user equipment
EPC evolved packet core
MME mobility management entity
S-GW serving gateway
RRC radio resource control
AP access point
BS base station
CC central controller
CCCH common control channel
CSCF call state control function
EPS evolved packet system
GW gateway
HSS home subscriber server
D2D device-to-device
IP internet protocol
IMS IP multimedia subsystem
NAI network access identifier
NAS non-access stratum
PDN GW packet data network GW
SGSN serving gateway support node
RB resource block
SRB signaling radio bearer
SAE evolved system architecture
SIP session initiation protocol
TMSI temporary mobile subscriber identity
OFDMA orthogonal frequency division multiple access
CDMA code division multiple access One specification of interest is 3GPP TS 36.300, V8.4.0 (2008-03), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8). This system may be referred to for convenience as LTE Rel-8, or simply as Rel-8. Note that this is a stage 2 specification, and may not exactly describe the system as it is currently expected to be implemented. In general, the set of specifications given generally as 3GPP TS 36.xyz (e.g., 36.311, 36.312, etc.) may be seen as describing the entire Release 8 LTE system.

Of particular interest herein are the further releases of 3GPP LTE targeted towards future IMT-A systems, referred to herein for convenience simply as LTE-Advanced (LTE-A). Reference can be made to 3GPP TR 36.913, V0.0.6 (2008-05), 3rd Generation Partnership Project; Technical Specification Group Radio Access Network; Requirements for Further Advancements for E-UTRA (LTE-Advanced) (Release X).

FIG. 1A is based on FIG. 4 of 3GPP TS 36.300, and shows the overall architecture of the E-UTRAN (Rel. 8) system. The E-UTRAN system includes eNBs, providing the E-UTRA user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME (Mobility Management Entity), by means of an S1-MME interface, as well as to a Serving Gateway (S-GW) by means of an S1-U interface. The S1 interface supports a many-to-many relation between MMEs/Serving Gateways and eNBs.

FIG. 1B is based on FIG. 4.2.1-1 of 3GPP TS 23.401 V8.0.0 (2007-12), Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 8), and shows the non-roaming architecture for 3GPP accesses. In addition to the S1-MME interface shown in FIG. 1A, there is also shown an S1-U interface to a serving gateway. The serving gateway is interfaced with the MME (S11 interface), with a SGSN (S4 interface), with UTRAN (S12 interface), and with a PDN gateway (S5 interface).

IMT-A comprises radio technologies that meet the requirements currently defined by ITU for radio technologies beyond IMT-2000 (year 2010 and beyond). 3GPP is currently defining a study item to prepare LTE-Advanced that meets the IMT-Advanced requirements. Competing technologies such as WiMAX are expected to define advanced versions of current standards to be IMT-Advanced technologies. For WiMAX, standardization of IMT-Advanced technology is currently taking place in the IEEE 802.16m task group.

Aspects of IMT-A may be expected to include D2D communication to enable new types of services, as well as flexible spectrum use (FSU) to increase the spectral efficiency in a multi-operator environment.

In previous wireless communication systems (e.g., GSM, UMTS) with a circuit switched architecture it was straightforward to detect D2D traffic, as the network elements (MSC) involved in the D2D setup are a part of the cellular core network. As a result the core network could readily check if both devices were in the same cell, or in adjacent cells, to request a measurement and to setup the D2D bearer.

In addition to GSM and UMTS, D2D has also been proposed or provided in other wireless communication technologies, for example in WLAN, Hiperlan/2, and Tetra.

Various US patents and patent application Publications that generally relate in some respect to peer-to-peer and mobile-to-mobile communication include: 2006/0178148, 2006/0160544, U.S. Pat. Nos. 7,050,821, 6,904,055, 6,415,146, 6,047,178, 5,995,500 and 5,666,661.

An ability to provide D2D communication is not supported by E-UTRAN (Rel. 8).

SUMMARY

The foregoing and other problems are overcome, and other advantages are realized, by the use of the exemplary embodiments of this invention.

In a first aspect thereof the exemplary embodiments of this invention provide a method that includes sending an initiation message from a first device to a network node to initiate device-to-device communication with a second device; receiving a message from the network node indicating a request for setting up radio resources for device-to-device communication; sending a message to the second device, the message comprising a request to set up resources for device-to-device communication and, in response to establishing device-to-device communication with the second device using the resources, sending an acknowledgment to the network node that device-to-device communication is established.

In another aspect thereof the exemplary embodiments of this invention provide a method that includes receiving a request from a first device, the request being one to establish device-to-device communication with a second device and comprising an identification of the second device; forwarding the request to a network node for converting the identification of the device into a network associated identification to determine if a device-to-device communication of the first device with the second device is possible and, if it is, receiving information that is descriptive of parameters needed to establish the device-to-device communication from the first device to the second device.

In another aspect thereof the exemplary embodiments of this invention provide a method that includes examining wireless network packet traffic that is originated by network nodes and that passes through at least one network access node to determine if a possibility exists to establish a direct communication between at least two of the network nodes; and if the possibility is found to exist, initiating setup of the direct communication between at least two of the network nodes.

The exemplary embodiments of this invention also encompass memory medium that store computer program instructions, the execution of which result in operations that perform various ones of the methods set forth above.

In a further aspect thereof the exemplary embodiments of this invention provide an apparatus that includes a transmitter, a receiver and a controller configurable with the transmitter and the receiver to send an initiation message from the apparatus, when functioning as a first device, to a network node to initiate device-to-device communication with a second device. The controller is further configured to receive a message from the network node indicating a request to set up radio resources for device-to-device communication and to send a message to the second device, the message comprising a request to set up resources for device-to-device communication. The controller is responsive to establishing device-to-device communication with the second device using the resources, to send an acknowledgment that device-to-device communication is established to the network node.

In a further aspect thereof the exemplary embodiments of this invention provide an apparatus that includes a controller and a receiver configurable with the controller to receive a request from a first device, the request being one to establish device-to-device communication with a second device and comprising an identification of the second device. The apparatus also includes an interface configurable with the controller to communicate with a network node to convert the identification of the second device into a network associated identification to determine if a device-to-device communication of the first device with the second device is possible and, if it is, to receive information that is descriptive of parameters needed to establish the device-to-device communication from the first device to the second device.

In a still further aspect thereof the exemplary embodiments of this invention provide an apparatus that includes a controller configurable to examine wireless network packet traffic that is originated by network nodes and that passes through at least one network access node to determine if a possibility exists to establish a direct communication between at least two of the network nodes. If the possibility is found to exist the controller is further configurable to initiate setup of the direct communication between at least two of the network nodes.

In yet another aspect thereof the exemplary embodiments of this invention provide an apparatus that includes means for sending an initiation message from a first device to a network node to initiate device-to-device communication with a second device; means for receiving a message from the network node indicating a request for setting up radio resources for device-to-device communication; means for sending a message to the second device, the message comprising a request to set up resources for device-to-device communication; and means, responsive to establishing device-to-device communication with the second device using the resources, for sending to the network node an acknowledgment that device-to-device communication is established.

In yet another aspect thereof the exemplary embodiments of this invention provide an apparatus that includes means for receiving a request from a first device, the request being one to establish device-to-device communication with a second device and comprising an identification of the second device; means for forwarding the request to a network node for converting the identification of the device into a network associated identification to determine if a device-to-device communication of the first device with the second device is possible; means for receiving information that is descriptive of parameters needed to establish the device-to-device communication from the first device to the second device; and means for sending at least one message to at least one of the devices to initiate radio bearer setup between the first device and the second device.

In another aspect thereof the exemplary embodiments of this invention provide an apparatus that includes means for examining wireless network packet traffic that is originated by network nodes and that passes through at least one network access node to determine if a possibility exists to establish a direct communication between at least two of the network nodes; and means for initiating setup of the direct communication between at least two of the network nodes.

BRIEF DESCRIPTION OF THE DRAWINGS

In the attached Drawing Figures:

FIG. 7 illustrates D2D radio bearer setup where both UEs are configured by the same eNB.

FIG. 8 shows D2D radio bearer setup where the eNB configures one UE after which this UE configures the other UE over the air interface.

DETAILED DESCRIPTION

The exemplary embodiments of this invention enable the setup of a D2D connection in the 3GPP evolved system architecture (SAE) environment. The exemplary embodiments provide a flexible approach to detecting D2D communication, and the setting up of a D2D connection within the 3GPP SAE.

Various aspects of these exemplary embodiments include, but are not limited to, providing the capability to detect D2D traffic at the eNB or at a GW; providing a signal that can be used during connection setup to indicate D2D traffic; providing interaction of the eNB with the MME and HSS to determine if a target UE is in a neighboring cell, and whether a D2D communication is possible; the introduction of a D2D policy server at the BS and techniques for charging for the D2D connection that is independent of the PDN-GW.

D2D communications will share the same band(s) used by the cellular network. As a result, it will be important to coordinate the D2D with the cellular network to be able to offer guaranteed service levels to the users in the cellular network. Thus, the D2D communication should be controlled by the cellular network.

Figure 1A:
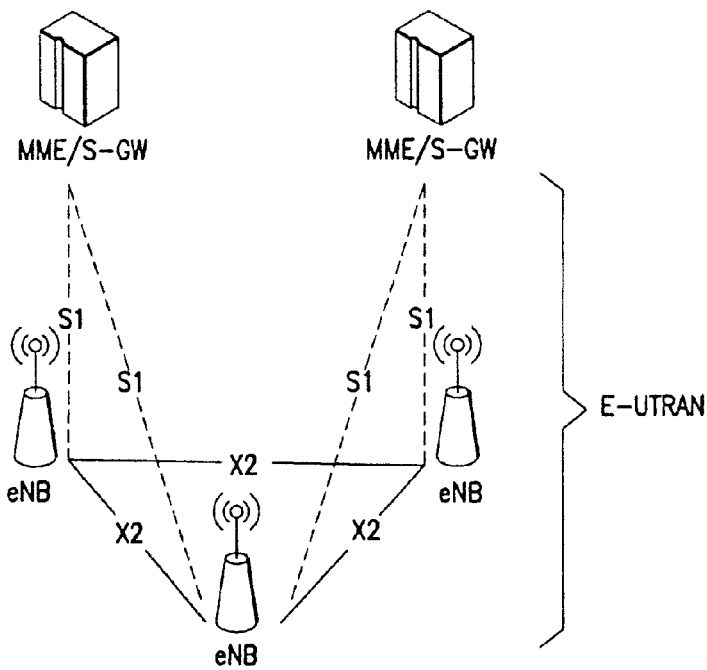
FIG. 1A reproduces FIG. 4 of 3GPP TS 36.300, and shows the overall architecture of the E-UTRAN system.
Figure 2:
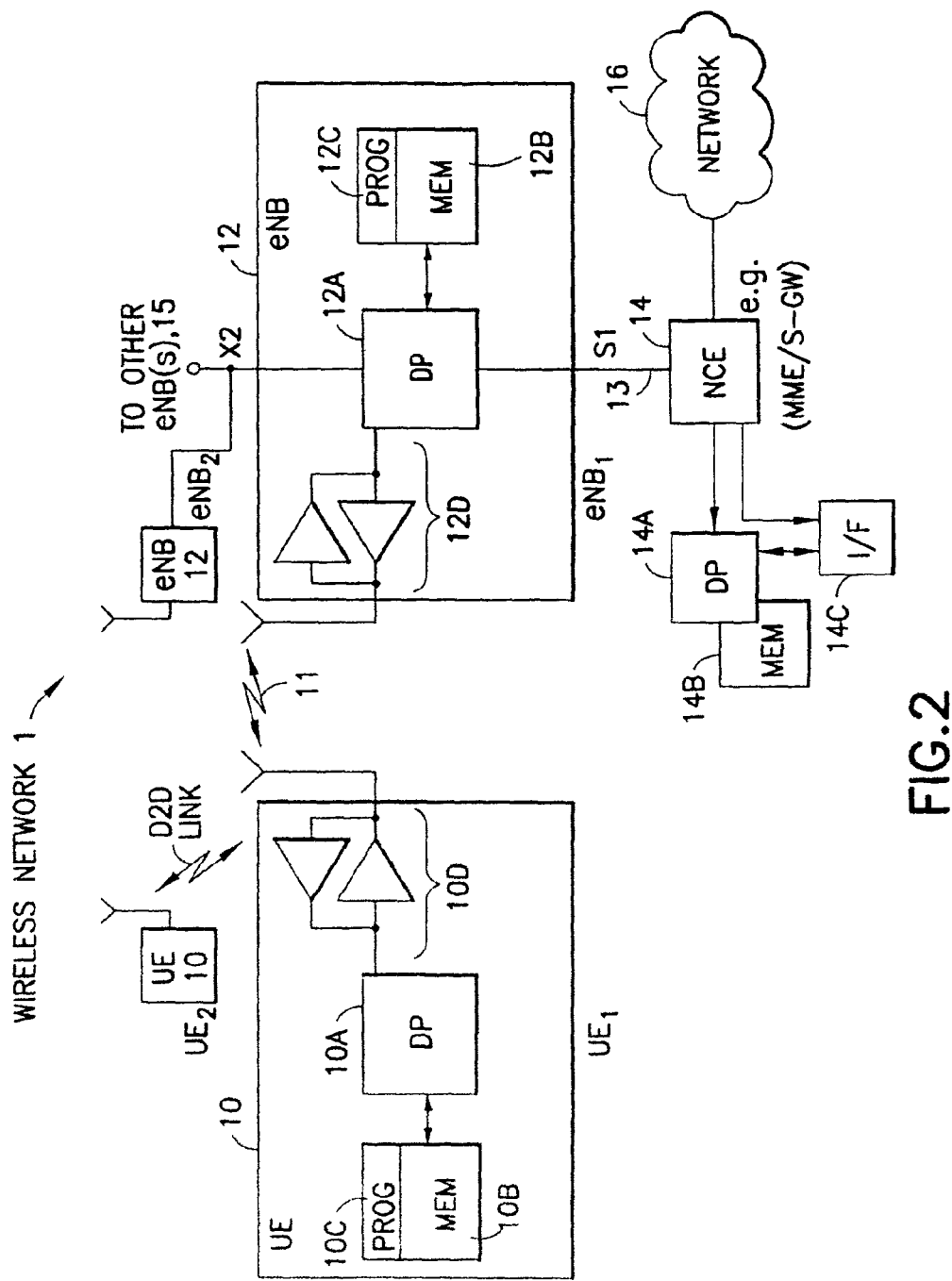
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node or network entity, such as a Node B (base station), and more specifically an eNB 12. The network 1 may include an infrastructure network control element (NCE) 14 (which may also be considered as a network entity) that may include the MME/S-GW functionality shown in FIG. 1A, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 1A. At least one of the PROGs 10C and 12C is assumed to include program instructions that, when executed by the associated DP, enable the electronic device to operate in accordance with the exemplary embodiments of this invention, as will be discussed below in greater detail. That is, the exemplary embodiments of this invention may be implemented at least in part by computer software executable by the DP 10A of the UE 10 and by the DP 12A of the eNB 12, or by hardware, or by a combination of software and hardware.

In practice there will be a plurality of UEs 10 (e.g., $UE_1$, $UE_2$) and a plurality of eNBs 12 (e.g., $eNB_1$, $eNB_2$). An ability to establish a communication path from $UE_1$ to $UE_2$ is an aspect of the exemplary embodiments of this invention, as described in further detail below.

Figure 1B:
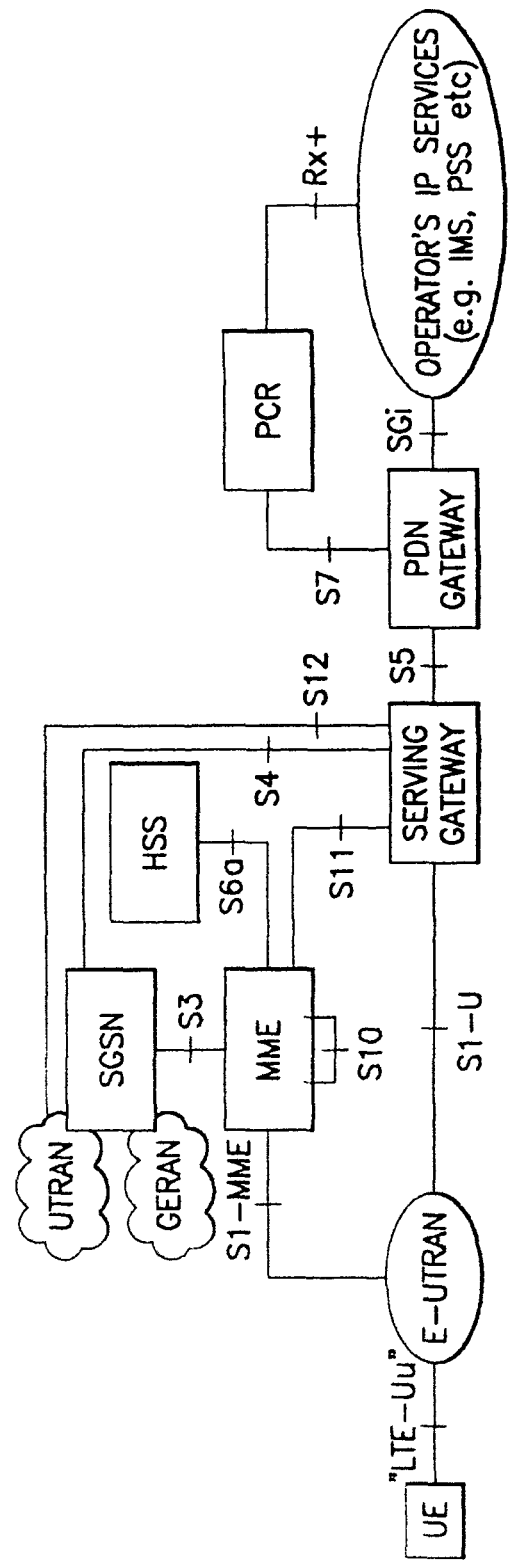
FIG. 1B is based on FIG. 4.2.1-1 of 3GPP TS 23.401 V8.0.0, and shows a non-roaming architecture for 3GPP accesses.

FIG. 2 also shows that the NCE 14 (which may be considered to represent any of the network infrastructure components, such as the MME, GWs, etc. shown in FIGS. 4, 5, 6, 10 and 11) may be constructed to also include at least one data processor 14A, a memory 14B that stores a computer program instructions, and suitable interface (I/F) circuitry for communication with other components via one or more interfaces (see, for example, the interfaces shown in FIG. 1B).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B, 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, 14A may be of any type suitable to the local technical environment, and may include one or more of general purpose computers, special purpose computers, microprocessors, digital signal processors (DSPs) and processors based on multi-core processor architectures, as non-limiting examples.

Figure 3:
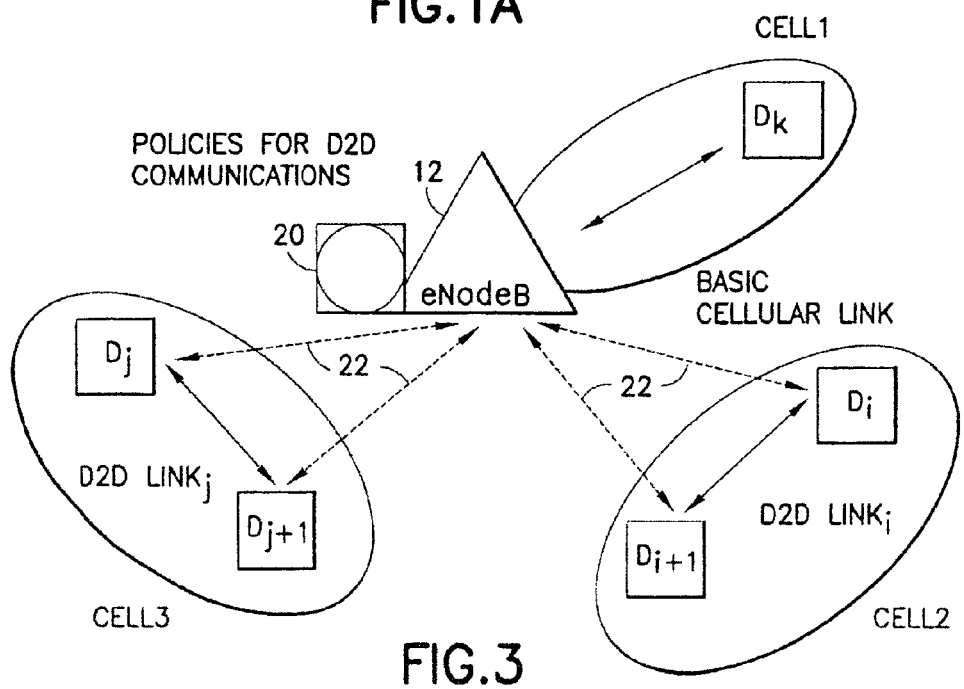
FIG. 3 illustrates the different entities involved or impacted by D2D communications in a cellular network.

FIG. 3 illustrates the different entities involved or impacted by D2D communications in a single cell of a cellular network. These entities include the devices (D, such as the UEs shown in FIGS. 1 and 2) engaged in a D2D communication session. There are also basic cellular links ongoing at the same time, and the base station (eNB 12) provides a gateway function to the network external to a cell. On FIG. 3 the dotted arrows indicate possible control links. Also shown associated with the eNB 12 is a server that provides policies for D2D communications (labeled 20).

For initial D2D connection setup at least one or more of the following features are assumed to exist:
1. The D2D session setup occurs outside of the cellular network. The network detects traffic between close by devices and initiates the D2D connection setup.
2. Another option is to check association status, and if associated with the eNB 12 contact the eNB 12 for permission to engage in D2D communication. If granted, the device (UE 10) engages in the D2D mode with eNB support.
3. However, if not associated with an eNB, scan if an eNB is in the surrounding area and associate if appropriate, and engage in D2D mode with eNB support.
4. If no eNB is available, then engage in direct D2D mode without eNB support.

These exemplary embodiments pertain more directly to D2D initiation for the features 1, 2 and 3 above.

After the eNB 12 receives the D2D initiation request, or detects traffic between close by devices, it can apply specific operational policies to control the D2D communication. These operational policies, provided by the policy server 20, can include at least some of the following:
set up a D2D connection instead of a cellular connection when $UE_1$ and $UE_2$ are in direct range;
grant a D2D connection request if the resultant interference caused to the cellular network would be below a threshold;
limit the total number of ongoing D2D connections to maintain interference below a threshold level;
communication/coordination with neighboring cell(s);
handover (HO) from a cellular connection to a D2D connection when the UEs 10 begin to be in direct range; and
handover back from a D2D to a cellular connection when needed.

The dotted lines designated as 22 in FIG. 3 indicate a control interface for the eNB 12. By the use of this control interface 22 a number of control scenarios may be handled. For example, the eNB 12 may handover some resources to the D2D devices, which they then schedule among themselves. Alternatively, the eNB 12 may remain in control of all resource allocations. A certain D2D connection may share the same resources as used for normal cellular operation within the cell. The eNB 12 may also request measurements from the UEs 10. For example, one measurement may be of the D2D link quality. The nature of such measurements depends on the implementation of the D2D radio interface itself. The eNB 12 may also make one node (e.g., a UE 10) a lead node in the D2D communication and grant resources to the lead node. The eNB 12 may also cancel a D2D link and re-establish the communication using basic cellular links.

Figure 4:
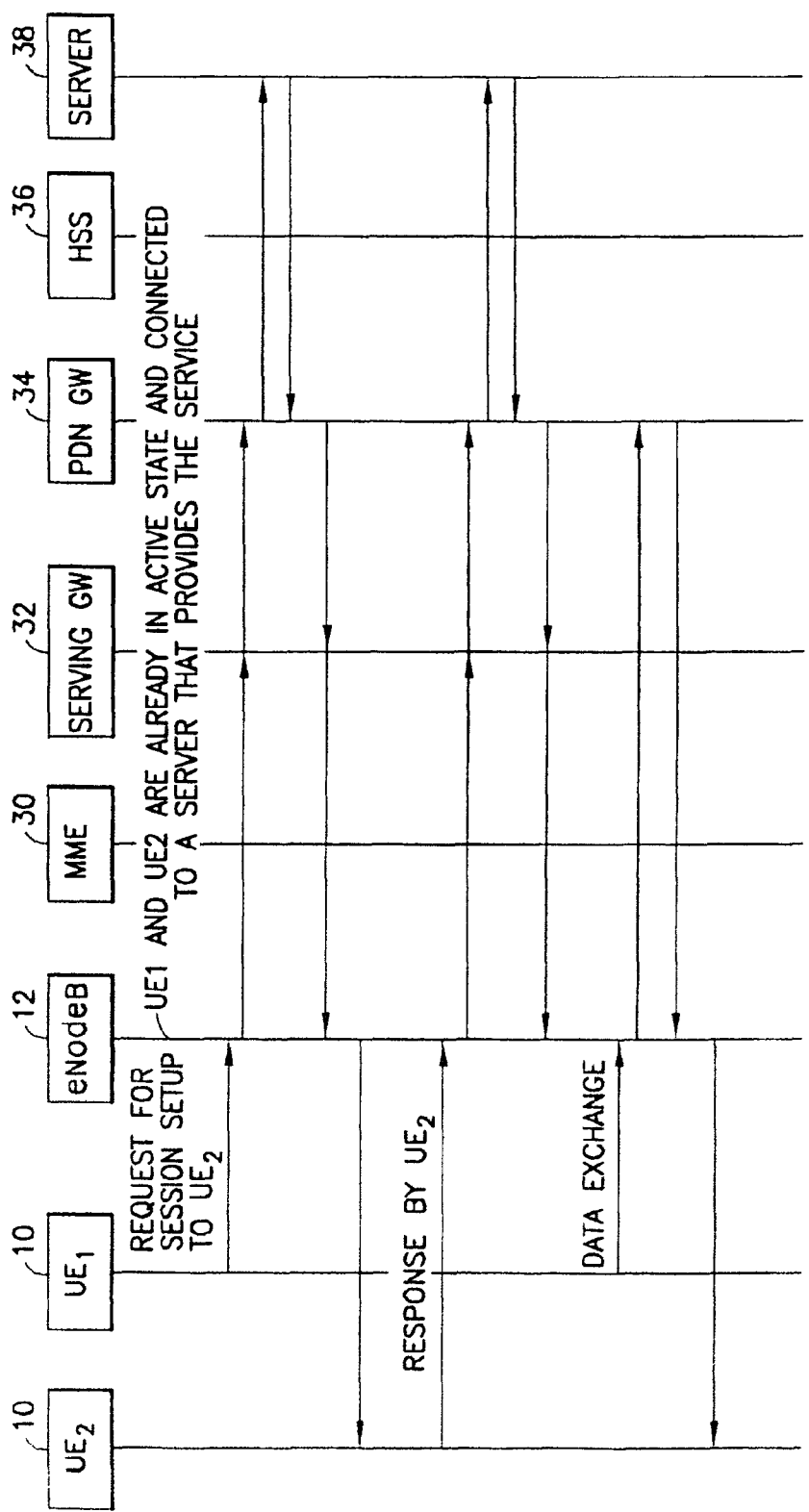
FIG. 4 shows session setup in a current SAE architecture.

Discussed now is D2D setup when session setup occurs outside of the cellular network, e.g., using a SIP server. FIG. 4 shows the session setup in the current SAE architecture. In addition to the UEs 10 and the eNB 12, there is shown a MME 30, a serving GW 32, a PDN GW 34, a HSS 36 and an external (e.g., SIP) server 38. Note that in this case the eNB 12 tunnels IP packets to the PDN GW 34, and is not aware of the presence of D2D traffic occurring within the same cell. Note that messages are transferred between the serving GW 32 and the PDN GW 34, and may be considered as representing one GW 33 (shown as such in FIGS. 5, 6, 10, 11 and 15). The one GW 33 may thus be considered to include two logical GWs that may be implemented as separate physical entities or as one entity. The two logical entities are the serving GW 32 and the PDN GW 34. The serving GW 32 terminates the interface toward the E-UTRAN, and plays an important role amongst others for inter-eNB 12 mobility. The PDN GW 34 terminates the interface towards the Packet Data Network(s) (PDN), and is amongst others responsible for UE 10 IP address allocation. Some of the decisions required at the GW 33 level require a binding between information from the two gateways 32 and 34, e.g., the used IP address combined with the eNB 12 that the UE is currently connected to.

In accordance with an aspect of the exemplary embodiments of this invention the eNB 12 is enhanced so as to exhibit the capability to detect IP traffic between two devices in the same cell. Additionally, when the eNB 12 detects a significant amount of traffic between a device in the own cell and a device in the same subnet, it contacts the PDN GW 34 to determine if the device with the second IP address is served by a neighboring eNB 12 that may be within D2D range of the two communication devices.

Figure 5:
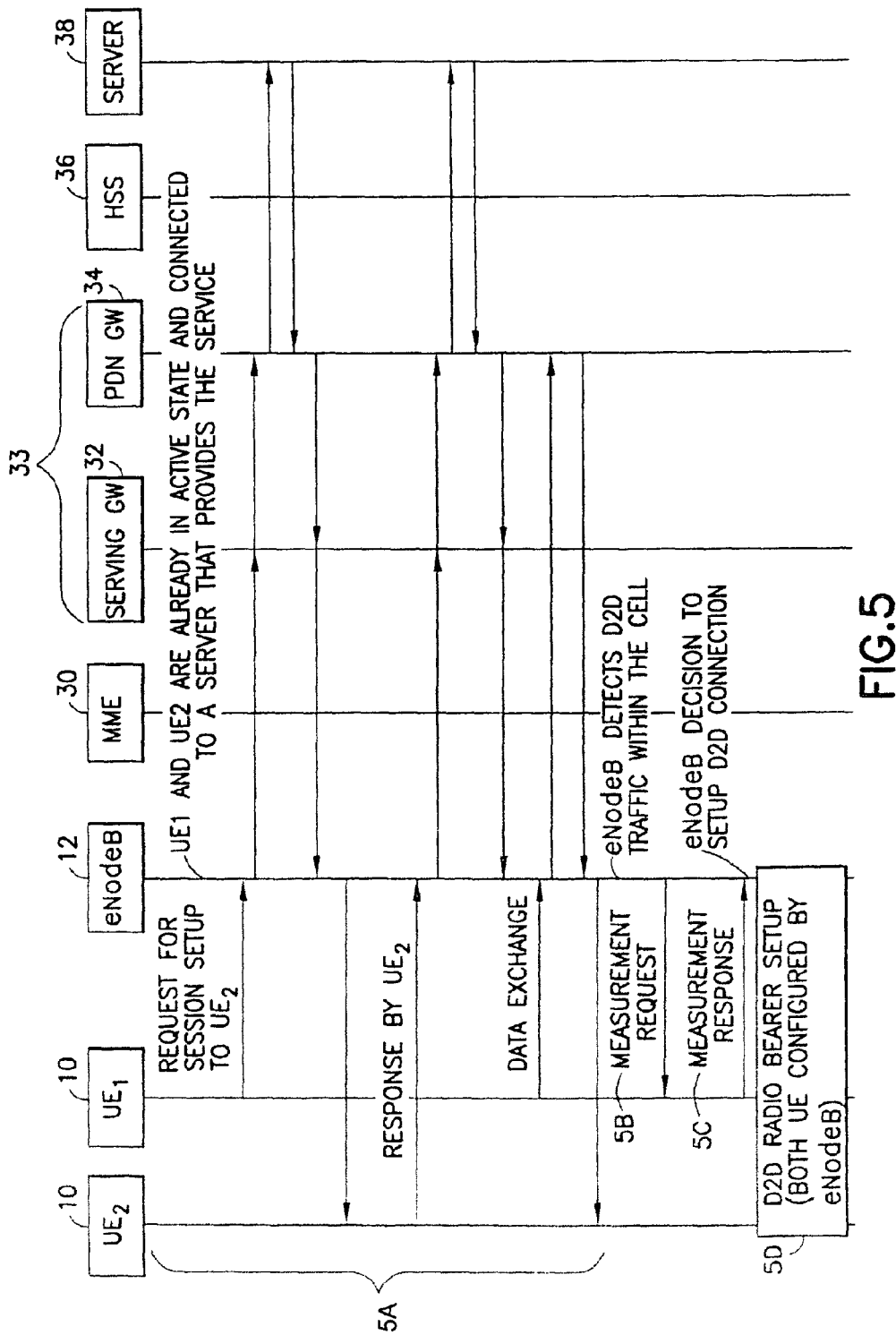
FIG. 5 depicts a D2D radio bearer setup initiated by an eNodeB that detects potential D2D traffic within the cell served by the eNB, where a measurement may be used to determine whether the UEs are within D2D range.

Referring to FIG. 5, there are shown the steps of the setup when both devices ($UE_1$, $UE_2$) are served by same cell. Note that the steps designated 5A can be the same as those shown in FIG. 4. Briefly, the session is initiated by one of the UEs 10, and messages and data flow between the UEs 10, the eNB 12, the PDN GW 34 and the session server (e.g., SIP server) 38. However, at 5B eNB 12 detects the presence of IP traffic between devices in its cell (e.g., by sniffing IP traffic), and requests measurements from the UEs 10 to determine whether they are within range (and if both of them are D2D capable). At 5C the measurement response is received. At 5D the eNB 12 determines whether $UE_1$ and $UE_2$ are in range of one another (and D2D capable) and the eNB 12 initiates a D2D radio bearer setup (if the D2D policy server 20 suggests a D2D setup). If the D2D connection setup is successful the eNB 12 maintains the core network bearer for cellular communication and radio resource control, however the user data is transmitted directly between the D2D nodes ($UE_1$, $UE_2$) on the radio bearer that was setup by the eNB 12. That is, $UE_1$ sends packets to the IP address of the second $UE_2$ using the D2D connection (and vice versa).

The ability to "sniff" IP traffic may generally imply that the eNB 12 is capable of examining at least packet headers (e.g., IP packet headers) to identify IP addresses of source and/or destination nodes. By so identifying IP addresses, such as temporary IP addresses that may be associated with mobile nodes serviced by the eNB 12, the eNB 12 obtains knowledge of the potential for a certain communication to be amenable to being handled by a D2D connection.

As an alternative to "sniffing" IP traffic by the eNB 12, the GW 33 can be used to detect IP traffic originating from the same area. IP traffic that is both originating from, and destined to, a source in the sub-network (sub-net) managed by the GW 33 is earmarked as potential D2D traffic, and a signaling message that further inspection of the possibility for D2D is needed can then be sent to the involved eNB 12 (the GW 33 maintains a binding between the active UEs 10 (e.g., an ID such as the IMSI and the IP address) and their serving eNBs 12). If D2D is possible the policy server 20 at the eNB 12 is used to determine if a D2D connection should be established. In the case where the UEs 10 are in neighboring cells the GW 33 sends to one of the eNBs 12 the signal to investigate the possibility of D2D, together with the address of the eNB 12 of the other D2D peer.

In this context the sub-net may be considered to comprise a part of the network that is managed by the same network node, for example a gateway or a router.

Figure 15:
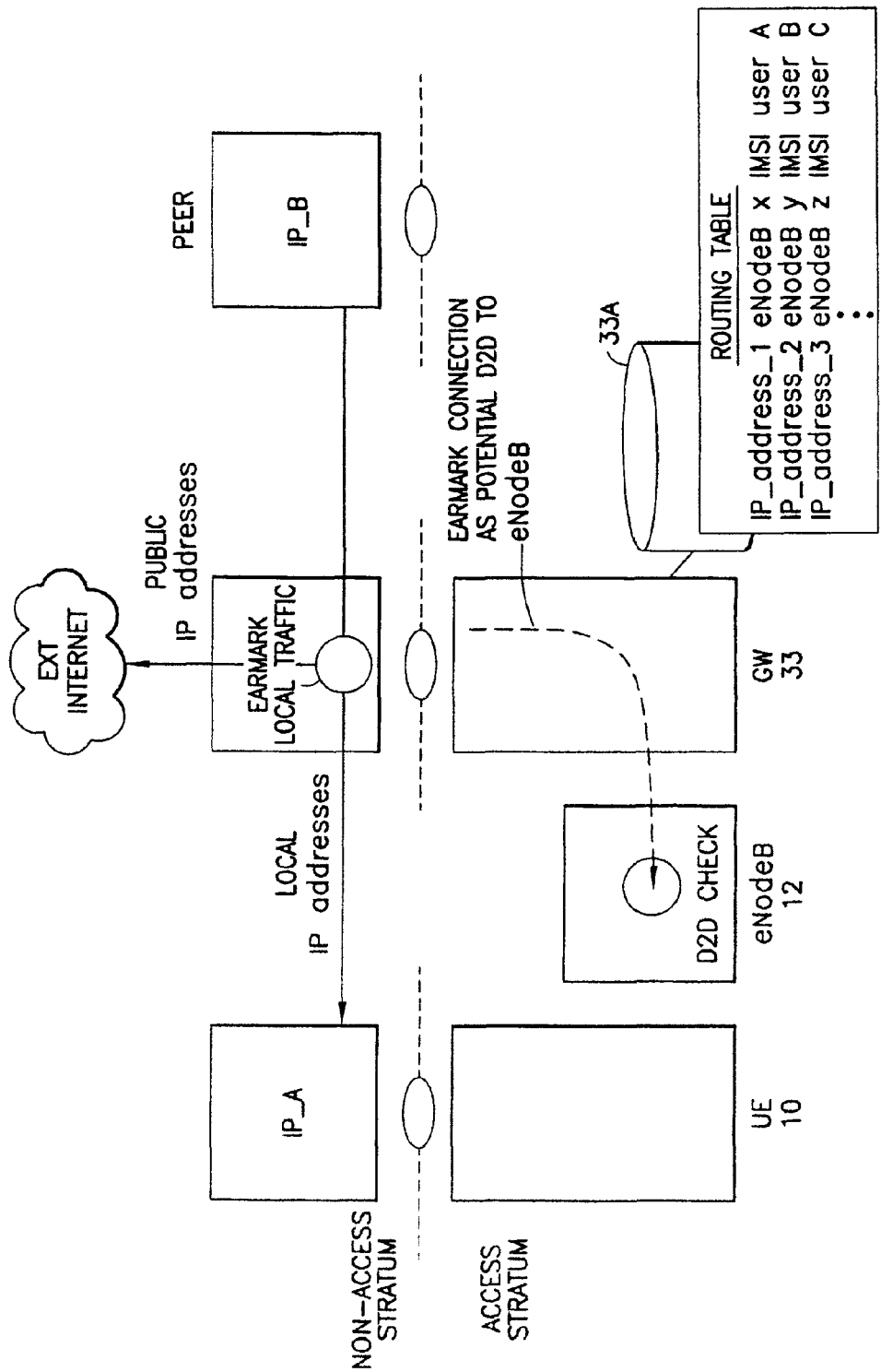
FIG. 15 is a simplified block diagram that is useful for explaining gateway analysis (sniffing) of packet traffic.

The above-described GW-implemented sniffing is illustrated in FIG. 15, which shows the non-access stratum, the access stratum, and the GW 33 that is coupled with a routing table 33A storing IP addresses in conjunction with information to identify the eNB serving the UE (e.g. eNB identifications) and UE identifications (e.g., the IMSIs). As illustrated, the GW 33 may distinguish local (e.g., temporary) IP addresses from public IP addresses, and uses the information in the routing table in order to detect the potential for D2D connections between certain of the UEs 10.

Note that the exemplary embodiments are not limited for use with only eNB 12 sniffing or GW 33 sniffing, and that a combination of both may be used if desired.

Figure 6:
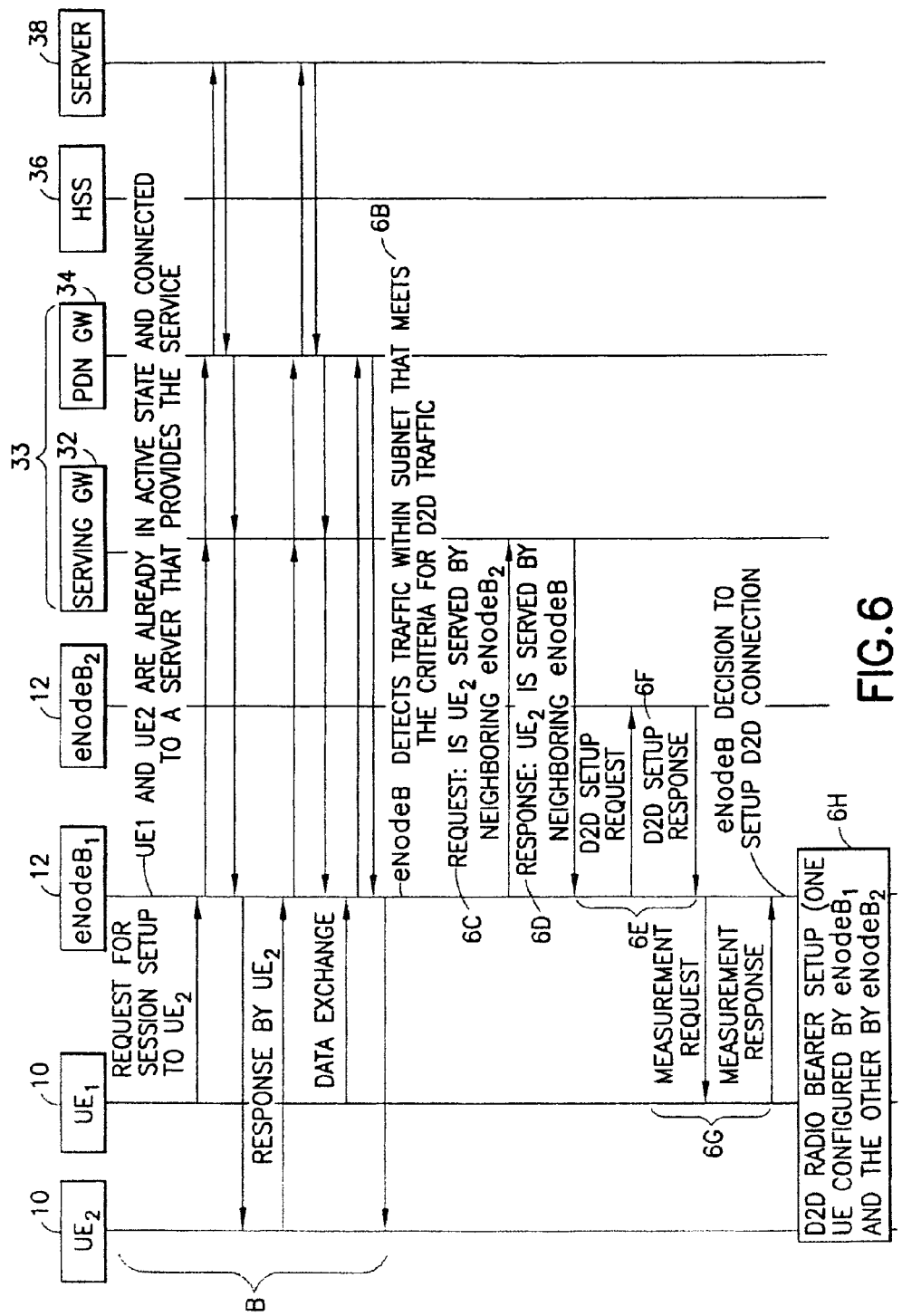
FIG. 6 depicts D2D radio bearer setup initiated by an eNodeB that detects potential D2D traffic within a subcell, where the eNodeB requests from a GW (that comprises both the serving GW and the PDN-GW) information that identifies an eNodeB that serves the second UE, and to which a D2D setup request is sent, where a D2D setup procedure and measurements are coordinated by the request.

Referring to FIG. 6, there are shown the steps of the setup when each device ($UE_1$, $UE_2$) is served by a different cell. Note that in this procedure the GW 33 is assumed to have an up-to-date overview of the connections (which UE 10 is serviced by which eNB 12), which may be obtained from the MME server 30. The steps designated 6A can be the same as those shown in FIG. 4, as described above in relation to FIG. 5. At 6B the eNB 12 (for example) detects IP traffic between devices in the same subnet (e.g., by sniffing IP packets). If the traffic fulfills certain criteria (e.g., radio resources consumed>x OFDMA resource blocks, data rate>x kbit per second) at 6C the eNB 12 contacts the GW 33 to determine if the second device is served by a neighboring eNB 12. If the second device is served by a neighboring eNB 12 as indicated in the response at 6D, the eNB 12 sends a request for D2D setup to the second eNB 12 ($eNB_2$). The setup request contains at least the IP address (or other identifier that is known to $eNB_1$) of $UE_2$. In response to receiving an affirmative request response at 6F, at 6G each eNB 12 requests a measurement from the respective UE 10 to determine whether they are within range of one another so as to conduct a D2D communication. If the responses indicate that the UEs 10 are within range (and D2D capable) the two eNBs 12 setup at 6H a D2D bearer (if the policy server(s) of each eNB 12 suggests a D2D setup). If the D2D connection setup is successful the eNBs 12 maintain the core network bearer for cellular communication and radio resource control, however the user data is transmitted directly between the D2D nodes ($UE_1$, $UE_2$) on the radio bearer that was setup for each by their respective eNBs 12. As a result, $UE_1$ sends packets to the IP address of the second $UE_2$ using the D2D connection (and vice versa).

After the D2D bearer has been established between the two nodes at step 6H it is still desirable for the eNB 12 to be able to perform radio resource control over the connection to the UEs 10. Further, one or both of the UEs 10 may still send data to the internet (i.e., not directly to the other UE 10). To this end the UE(s) 10 preferably remain in the RRC_Connected state, and a default (EPS) bearer to the gateway (PDN GW 34) is maintained (i.e., a complete tear-down of the network part of the bearers is preferably avoided).

Figure 9:
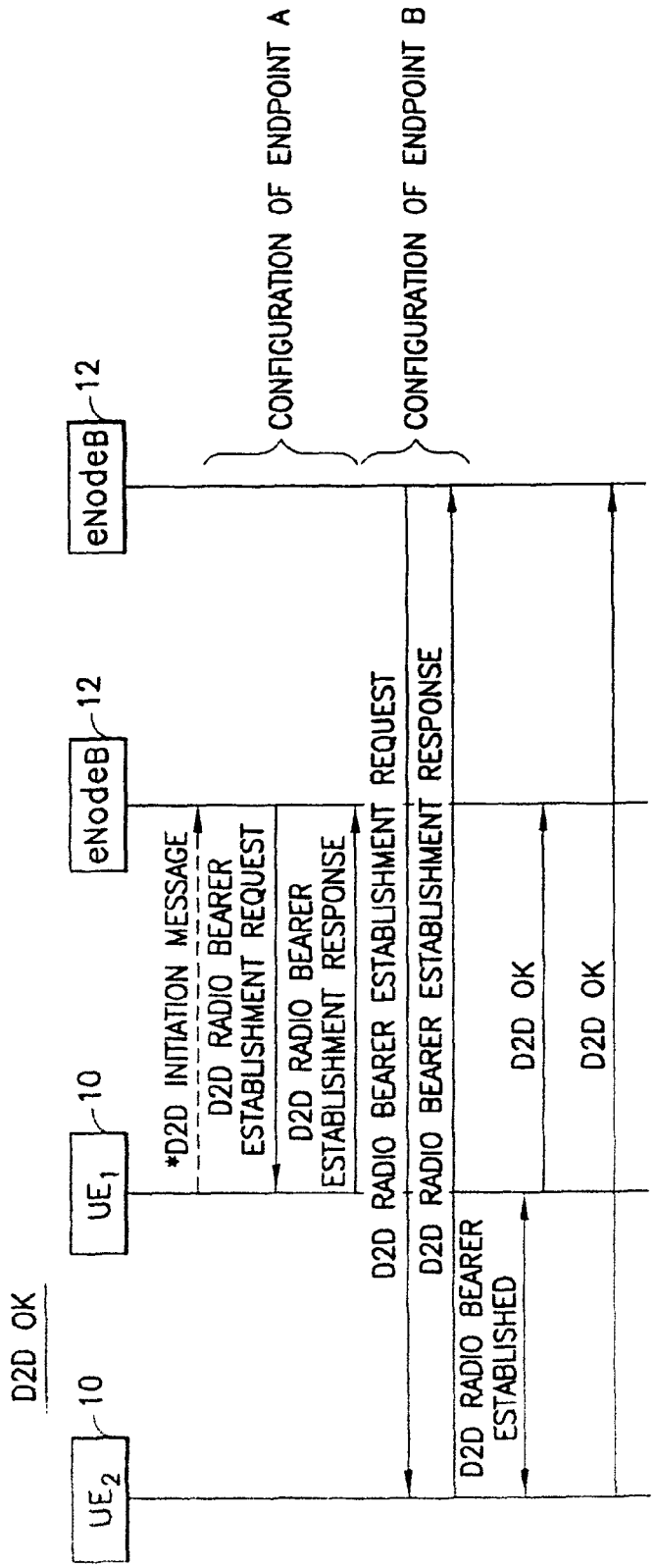
FIG. 9 shows D2D radio bearer setup where the UEs are associated with different eNBs, and where each eNB is responsible for configuring its associated UE.

The D2D connection setup can be performed in several ways. For example, the eNB 12 can configure both nodes ($UE_1$, $UE_2$), as shown in FIG. 7, or the eNB 12 may configure one node (e.g., $UE_1$) after which this node configures the other node ($UE_2$) over the air interface, as shown in FIG. 8. For the case where the two nodes are in cells served by two eNBs 12, one UE 10 is configured by one eNB 12 and the second UE 10 by the other eNB 12, as shown in FIG. 9. In this case $UE_2$ may receive data from $UE_1$ using, for example, resources assigned for a D2D control channel.

The resources assigned for a D2D control channel may include, for example, a set of OFDMA resource blocks, CDMA codes, time slots, frequency channels, etc. These resources may be pre-defined within the resources used by the eNB 12. For example, in those networks with dynamic resource assignment by, for example, flexible spectrum usage procedures these pre-defined resources may also be relative to, e.g., the first OFDMA resource block, time slot, CDMA code, or frequency channel assigned to the eNB 12. These resources may also be announced by the eNB 12 using, for example, a control channel.

Note that each of these FIGS. 7, 8 and 9 show an optional first step (message) where a particular UE 10 makes a request to the eNB 12 to initiate the D2D communication (as opposed to the eNB 12 autonomously detecting the traffic and initiating the D2D communication setup).

Figure 10:
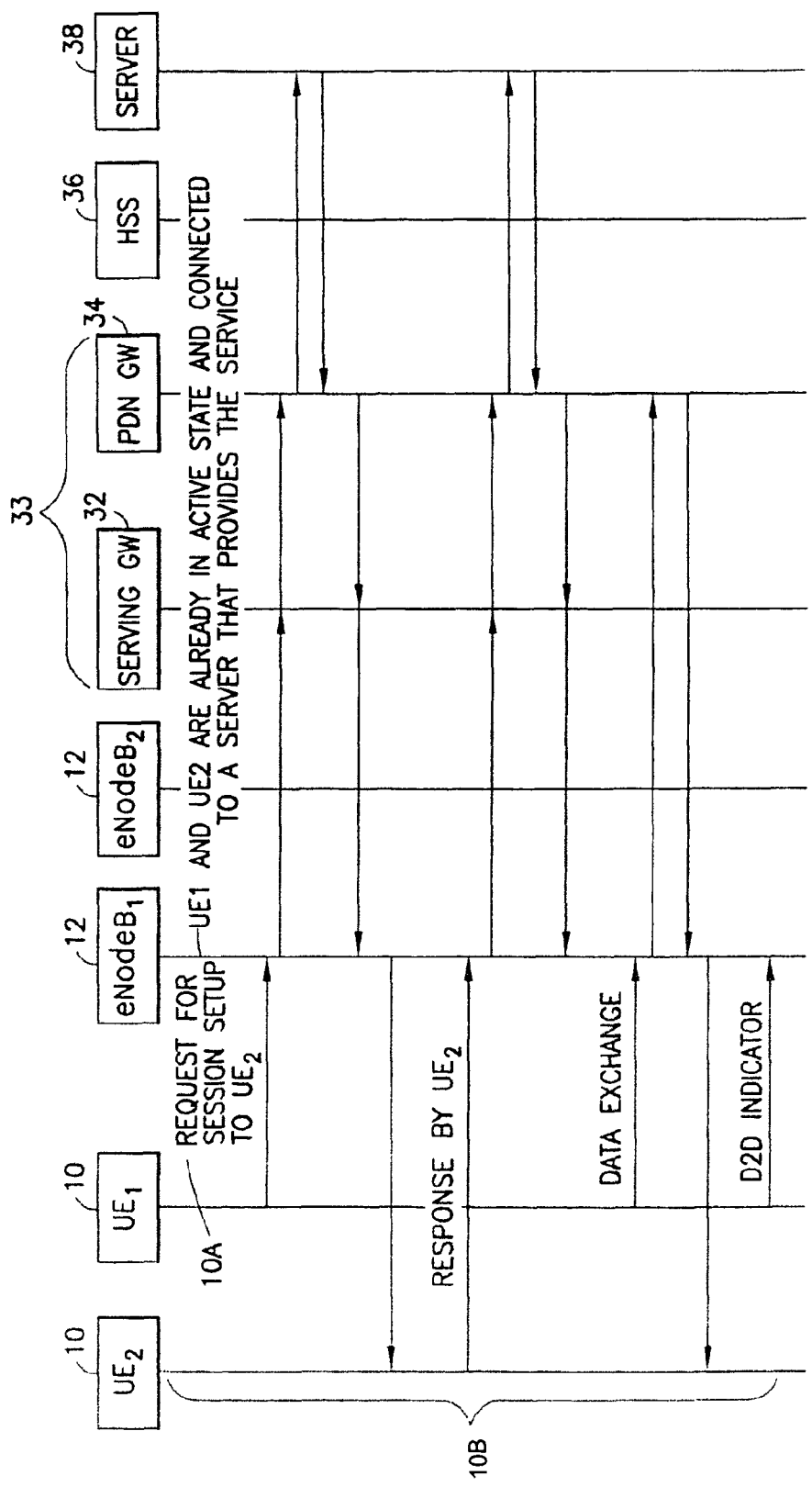
FIG. 10 shows a case where, after or during session setup, one of the UEs signals to the eNB that the traffic should be handled by a D2D connection.

Discussed now is an embodiment of the D2D setup when the session setup occurs outside of the cellular network, but with indication to the eNB 12 that the connection should be a D2D connection. Referring to FIG. 10, in this case assume that the UE 10 ($UE_1$) sends a message to the eNB 12 (after or during session setup) in which it indicates that the traffic to the IP address of $UE_2$ should be handled by a D2D connection (step 10A). The eNB 12 then initiates (steps 10B) the D2D bearer setup as illustrated in FIG. 5 or 6, depending on the location of $UE_2$ (same cell or different cell).

Discussed now in greater detail is D2D mode setup with eNB 12 support that occurs within the network. Note that currently SIP sessions (as an example) within the LTE architecture are setup similarly to the case illustrated in FIG. 10, even though the server might be inside the cellular network (using the user plane (UP)). The following procedure, which is a further aspect of the exemplary embodiments of this invention, permits D2D connection setup over the control plane (CP) that avoids scanning by the eNB 12 for potential D2D traffic, and which allows the setup of a D2D connection during the session initiation.

Radio Bearer Setup

In an exemplary embodiment the connection setup may take place in the E-UTRAN Access (Release 8) Evolved Packet Data System (EPS). Reference in this regard may be made to 3GPP TS 23.401 V8.0.0 (2007-12), Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 8).

Figure 11:
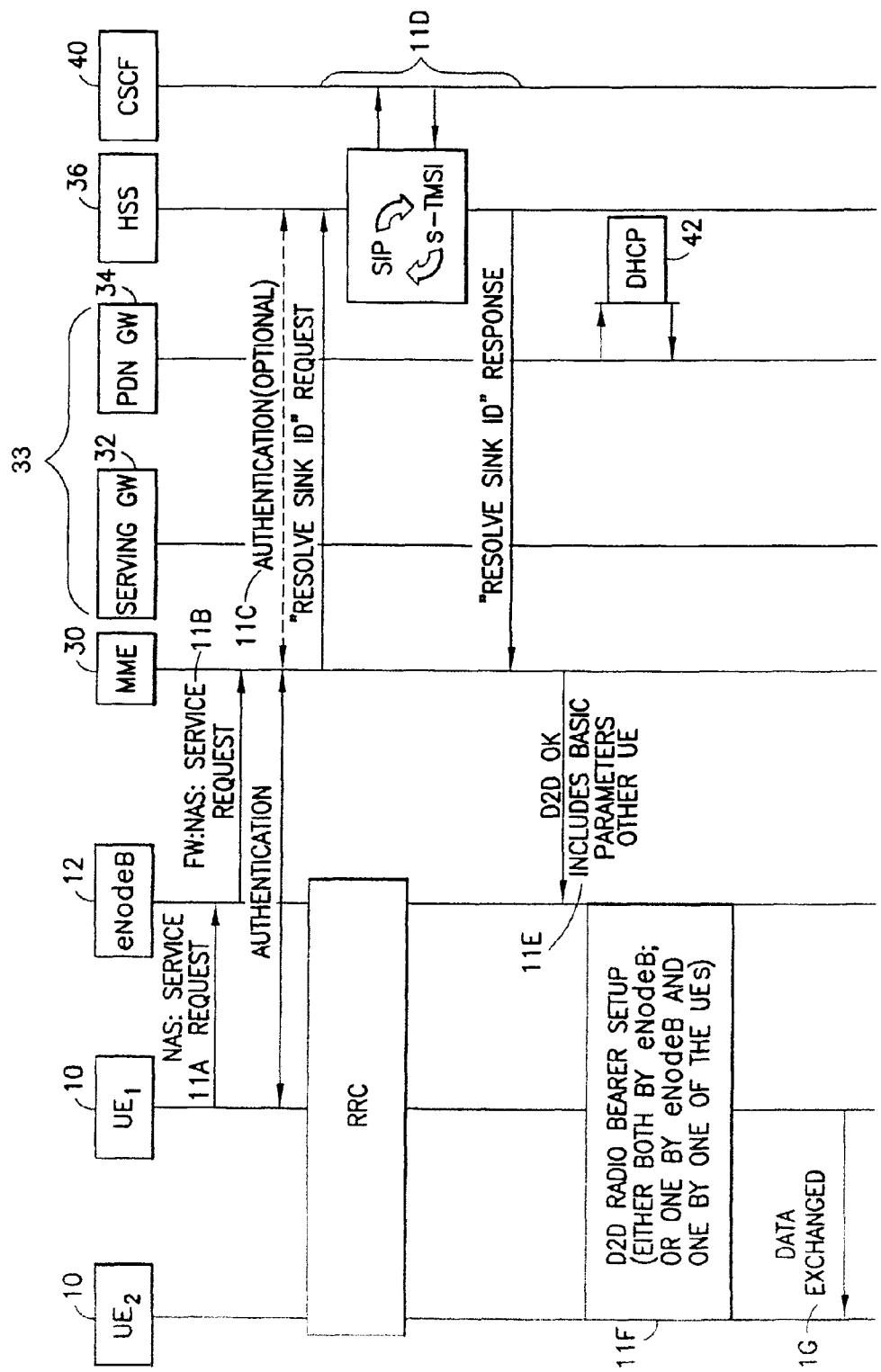
FIG. 11 shows an embodiment of a UE triggered service request procedure for D2D, where the radio bearer in both D2D devices is established by the eNB.

Referring to FIG. 11, the involved nodes are the UEs 10, the eNB 12, the MME 30 and the HSS 36 (and optionally the CSCF 40 and DHCP 42). The MME 30 contains the information of the UE 10 after an ATTACH procedure, and can be updated using a TRACKING procedure. However, if desired the HSS 36 can be contacted to obtain the correct information about the user (e.g., mapping of the SIP address to a s-TMSI of the target UE 10). FIG. 11 illustrates a UE triggered Service Request procedure for D2D links. It is assumed that the nodes are already connected to the network via an attach procedure so that service requests can be sent. It is also assumed that a SIP to s-TMSI conversion takes place in the HSS 36 with the assistance of other network nodes if needed (e.g., the CSCF 40).

At step 11A a D2D service request is sent from $UE_1$ as a NAS message to the eNB 12 and is then forwarded to the MME 30 (step 11B). The message includes an identifier of the destination UE ($UE_2$, e.g., SIP identifier sip:firstname.lastname@domain.eu, tel+358-Y). An optional authentication step 11C may be carried out between the MME 30 and the HSS 36 and $UE_1$. At 11D the (e.g.) SIP address is converted into a s-TMSI to find the destination $UE_2$ in the MME 30. If the s-TMSI is in the MME 30, the MME 30 checks whether the nodes are in the same cell or in neighboring cells. If a D2D link establishment attempt is permitted, a D2D OK message is sent from the MME 30 to the eNB 12 at step 11E. The D2D OK message includes the basic parameters of the other UE (UE$_2$). At 11F the two peers of the D2D communication are configured, either both by the eNB 12, or one by the eNB 12 and the other one via the peer node, as was discussed above in relation to FIGS. 7 and 8, and the D2D connection between the two peers (UE$_1$, UE$_2$) is established. If this is successful a D2D OK is sent to the eNB 12 (and if not a normal network connection is established). At 11G data (e.g., IP packets) are sent between the peer nodes using the established D2D connection.

In the foregoing it may be assumed that the communication is accomplished via the control plane, so that no user plane bearers are created other than for the D2D link.

After the basic D2D radio bearer has been created an IP address and TCP transport protocol may be required for the operation of the device. For a D2D exclusive connection an IP address from a private address space, e.g., 192.168.0.0-192.168.255.255 (in accordance with, for example, RFC1918, Network Working Group, Y. Rekhter et al., February 1996, "Address Allocation for Private Internets") may be used. In both the D2D exclusive case, or in the case where "normal" network interaction is required, the DHCP server 42 located at the PDN gateway 34 may be used for issuing IP addresses.

As was discussed above, in this embodiment the service request for a D2D link is made to the eNB 12, which forwards the request to the MME 30. After (optional) authentication an OK is given, including basic parameters if needed of the target UE (UE$_2$). The radio bearer is then established in one of several possible ways (e.g., see again FIGS. 7, 8 and 9).

It should be appreciated that the exemplary embodiments of this invention may be used to establish a D2D connection during an on-going communication, such as if the eNB 12 or the GW 33 detects a potential to establish a D2D connection between two or more UEs 10 that are transferring packet traffic, and may be used as well to establish a D2D connection when a particular session is first set up (e.g., see the optional first step of FIGS. 7, 8 and 9, as well as the procedure depicted in FIG. 11). Further, these exemplary embodiments enable a particular communication session to initially be set up as a D2D connection, and to then transition to being a non-D2D connection (e.g., to be continued as a cellular connection), such as if the channel between the UEs 10 degrades due to mobility of one or more of the UEs 10 involved in the D2D connection. The ability to transition back to the D2D connection is also provided.

In general, a potentially best point at which to operate the policy server 20 to determine whether to establish a D2D connection (UE$_1$ directly to UE$_2$) or a cellular connection (UE$_1$ to UE$_2$ via the eNB 12 and the network infrastructure) is before forwarding the request to the MME 30 (before step 11B), or after receiving the OK from the MME 30 (after step 11E).

Note that the policy server 20 may be co-located with the eNB 12 (as shown generally in FIG. 3), or it could be located remotely from the eNB 12. Note as well that single policy server 20 may service a plurality of eNBs 12.

In LTE charging is performed based on the load through the GWs, either the PDN GW 34 or the serving GW 32. However, in the D2D case it may be desirable to not involve these nodes in charging and accounting. Different possible billing options include, but are not limited to, checking for a subscription to use the D2D communication service during authentication (this could be, for example, a fixed fee on top of a user subscription, or flat-rate contract). Note that a surcharge may be for a specific service running on top of D2D connections, or for the basic D2D service. Another option is to contact the PDN-GW 34 for the IP address, and initiate billing at connection setup and terminate billing when the IP address is released at D2D connection end. As another option, the UE 10 may locally maintain billing information and forward it when the connection ends (e.g., to the PDN-GW 34). Various combinations of these may also be used, such as a combination of contacting the PDN-GW 34 for the IP address, and maintaining the billing records locally at the UE 10. In general, the billing data may include, as a non-limiting example, the volume of the exchanged data, per link setup (and counting of the number of link setups).

As should be appreciated, a number of advantages can be obtained through the use of these exemplary embodiments of this invention. For example, there is provided a novel and efficient bearer setup for device-to-device communication, the use of which can be especially attractive in the LTE and LTE-type systems. In addition, there is provided a capability to perform device-to-device communication in parallel with cellular network operation.

It should be further appreciated that although the description thus far has been primarily in the context of two UEs 10 that are involved in the D2D connection, the use of these exemplary embodiments may involve more than two UEs 10 in a given D2D connection. For example, one or more of FIGS. 7, 8 and 9 may be modified to include a UE$_1$, UE$_2$ and UE$_3$, or a UE$_1$, UE$_2$, UE$_3$ and UE$_4$ (etc.)

Based on the foregoing it should be apparent that the exemplary embodiments of this invention provide a method, apparatus and computer program product(s) to setup and establish D2D communication in a wireless communication system.

Figure 12:
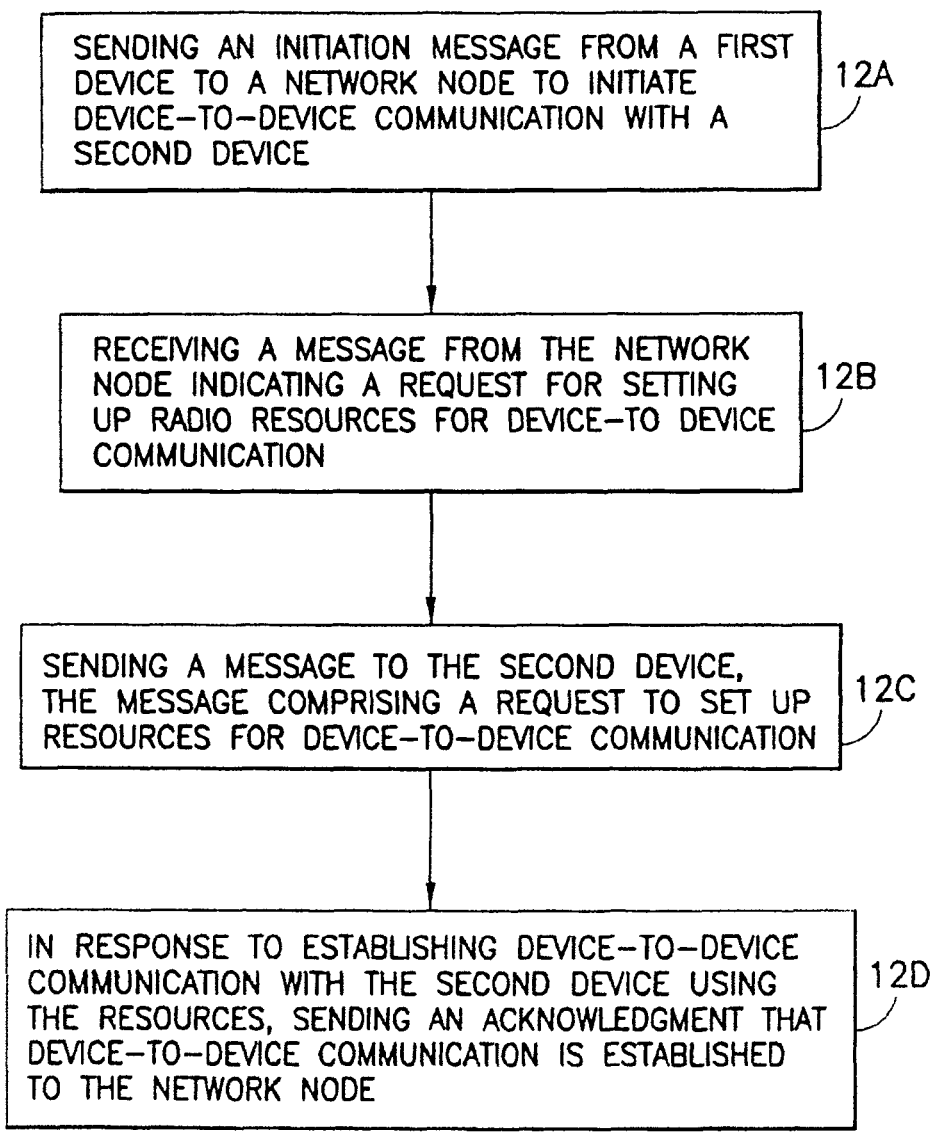
FIG. 12 is a logic flow diagram that illustrates the operation of a method, and a result of execution of computer program instructions, in accordance with the exemplary embodiments of this invention for establishing a D2D connection between a first UE and a second UE, where the first UE configures the second UE.

FIG. 12 is a logic flow diagram that illustrates the operation of a method, and a result of execution of computer program instructions, in accordance with the exemplary embodiments of this invention. At Block 12A there is a step of sending an initiation message from first device to a network node to initiate device-to-device communication with a second device. At Block 12B there is a step of receiving a message from the network node indicating a request for setting up radio resources for device-to-device communication. At Block 12C there is a step of sending a message to the second device, the message comprising a request to set up resources for device-to-device communication. At Block 12D there is a step of, in response to establishing device-to-device communication with the second device using the radio resources, sending an acknowledgment that device-to-device communication is established to the network node.

Figure 13:
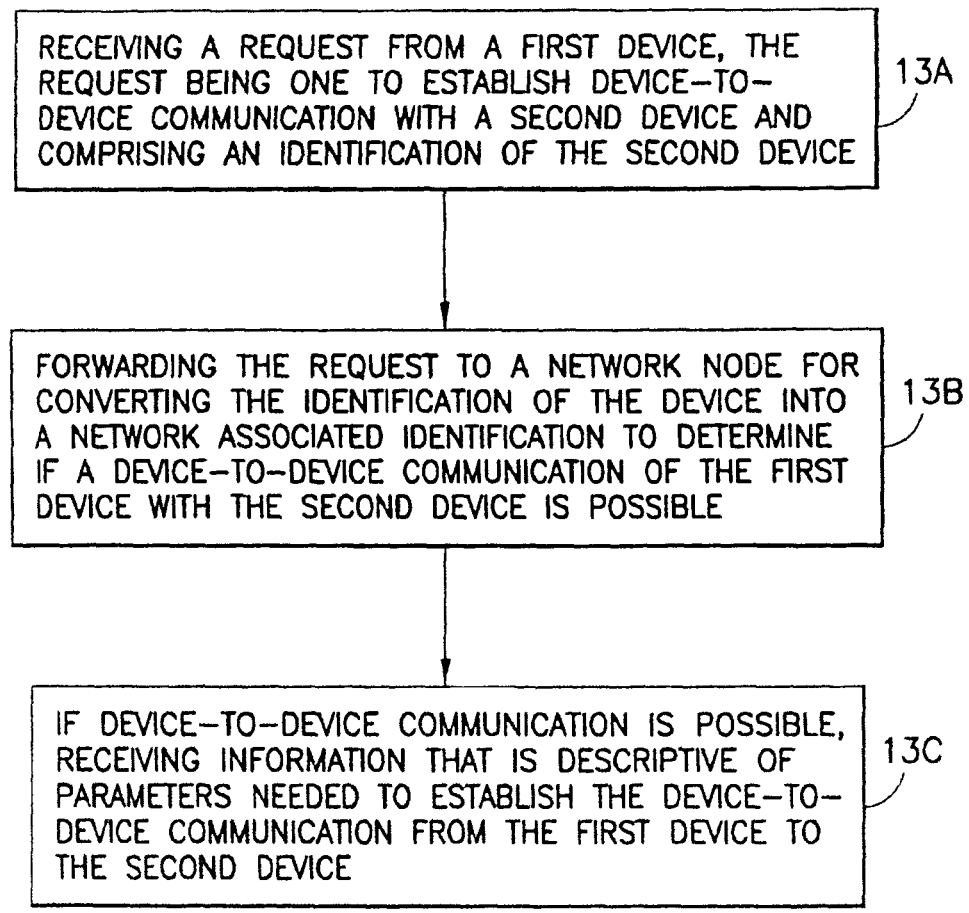
FIG. 13 is a logic flow diagram that illustrates the operation of a method, and a result of execution of computer program instructions, in accordance with the exemplary embodiments of this invention for establishing a D2D connection between a first UE and a second UE, and more specifically is descriptive of message flow between a network access point or node and at least one other network infrastructure node.

FIG. 13 is a logic flow diagram that illustrates the operation of a method, and a result of execution of computer program instructions, in accordance with the exemplary embodiments of this invention for establishing a D2D connection between a first UE and a second UE, and more specifically is descriptive of message flow between a network access point or node, such as the eNB 12, and at least one other network infrastructure node, such as the MME 30. At Block 13A there is a step of receiving a request at a network access node from a first device, the request being one to establish device-to-device communication with a second device and comprising an identification of the second device. At Block 13B there is a step of forwarding the request to a network node for converting the identification of the device into a network associated identification to determine if a device-to-device communication of the first device with the second device is possible. At Block 13C there is a step, if device-to-device communication is possible, of receiving information at the network access node that is descriptive of parameters needed to establish the device-to-device communication from the first device to the second device.

Figure 14:
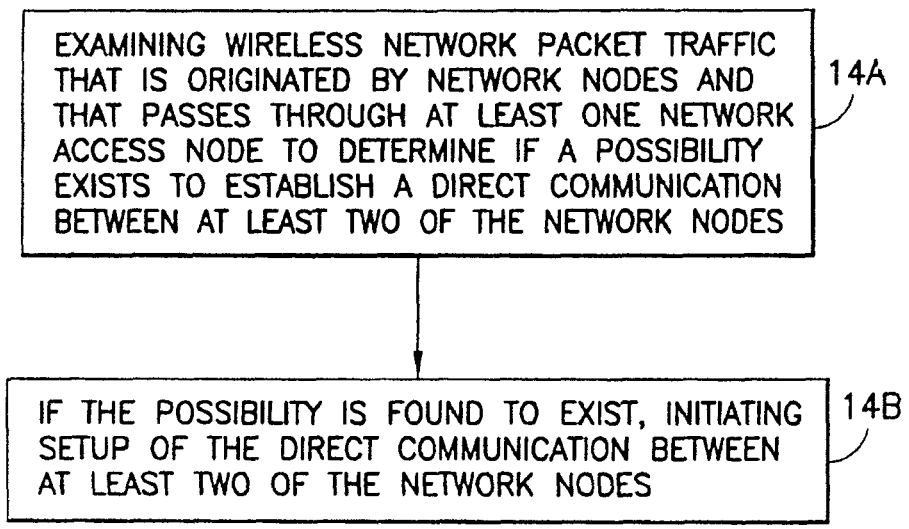
FIG. 14 is a logic flow diagram that illustrates the operation of a further method, and a result of execution of computer program instructions, in accordance with the exemplary embodiments of this invention.

FIG. 14 is a logic flow diagram that illustrates the operation of a method, and a result of execution of computer program instructions, further in accordance with the exemplary embodiments of this invention. At Block 14A there is a step of examining wireless network packet traffic that is originated by network nodes and that passes through at least one network access node to determine if a possibility exists to establish a direct communication between at least two of the network nodes. At Block 14B, if the possibility is found to exist, there is a step of initiating setup of the direct communication between at least two of the network nodes.

The various blocks shown in FIGS. 12, 13 and 14 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN and IMT-A systems, it should be appreciated that the exemplary embodiments of this invention are not limited for use with only these particular types of wireless communication system, and that they may be used to advantage in other wireless communication systems.

Further, the various names used for the network nodes (e.g., MME, PDN GW, HSS, etc.) are not intended to be limiting in any respect, as these nodes may be identified by any suitable names.

Furthermore, it should be appreciated that the request to the UE(s) 10 to setup the D2D connection may originate from a network entity within the cellular system, such as from the eNB 12 as generally described above, or it may originate from outside of the cellular network, such as from a server that is external to the cellular network.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   sending an initiation message from a first device to a network node to initiate device-to-device communication with a second device;
   receiving a message from the network node notifying the first device that a request for setting up radio resources for device-to-device communication is being made;
   sending a message to the second device, the message comprising a request to set up resources for device-to-device communication, wherein the resources are specified at least in part by the first device from a set of resources allocated by the network node; and
   in response to establishing device-to-device communication with the second device using the resources, sending to the network node an acknowledgment that device-to-device communication is established.

2. The method of claim 1, wherein an acknowledgment of the receipt of the message indicating that the resources for device-to-device communication are to be set up is sent before sending the message to the second device.

3. The method of claim 1, wherein sending the message to the second device is followed by receiving an acknowledgment from the second device of receipt of the message indicating that the resources for device-to-device communication are to be set up.

4. The method of claim 1, wherein the first device persists in a radio resource control connected state via the network node after establishing the device-to-device communication with the second device.

5. The method of claim 1, wherein the resources are specified by the network node.

6. A non-transitory computer readable medium storing a program of instructions, execution of which by a processor configures an apparatus to at least:
   send an initiation message from the apparatus, functioning as a first device, to a network node to initiate device-to-device communication with a second device;
   receive a message from the network node indicating that a request for setting up radio resources for device-to-device communication is being made;
   send a message to the second device, the message comprising a request to set up resources for device-to-device communication, wherein the resources are specified at least in part by the first device from a set of resources allocated by the network node; and in response to establishing device-to-device communication with the second device using the resources, send to the network node an acknowledgment that device-to-device communication is established.

7. The non-transitory computer readable medium of claim 6, wherein an acknowledgment of the receipt of the message indicating that the resources for device-to-device communication are to be set up is sent before sending the message to the second device.

8. The non-transitory computer readable medium of claim 6, wherein sending the message to the second device is followed by receiving an acknowledgment from the second device of receipt of the message indicating that the resources for device-to-device communication are to be set up.

9. The non-transitory computer readable medium of claim 6, wherein the apparatus persists in a radio resource control connected state via the network node after establishing the device-to-device communication with the second device.

10. The non-transitory computer readable medium of claim 6, wherein the resources are specified by the network node.

11. An apparatus, comprising:
at least one processor;
memory storing computer program code;
wherein the memory storing the computer program code is configured to, with the at least one processor, cause the apparatus to at least:
send an initiation message from the apparatus, functioning as a first device, to a network node to initiate device-to-device communication with a second device;
receive a message from the network node indicating that a request to set up radio resources for device-to-device communication is being made; and
send a message to the second device, the message comprising a request to set up resources for device-to-device communication, wherein the resources are specified at least in part by the first device from a set of resources allocated by the network node, and, responsive to establishing device-to-device communication with the second device using the resources, send to the network node an acknowledgment that device-to-device communication is established.

12. The apparatus of claim 11, wherein an acknowledgment of the receipt of the message indicating that the resources for device-to-device communication are to be set up is sent before sending the message to the second device.

13. The apparatus of claim 11, wherein sending the message to second device is followed by receiving an acknowledgment from the second device of the receipt of the message indicating that the resources for device-to-device communication are to be set up.

14. The apparatus of claim 11, wherein the apparatus persists in a radio resource control connected state via the network node after establishing the device-to-device communication with the second device.

15. The apparatus of claim 11, wherein the resources are specified by the network node.

16. The apparatus of claim 11, embodied in at least one integrated circuit.

* * * * *